United States Patent
Takeuchi et al.

(10) Patent No.: US 7,435,011 B2
(45) Date of Patent: Oct. 14, 2008

(54) SUBSTRATE FOR OPTICAL FIBER ARRAY AND METHOD FOR FABRICATING THE SAME

(75) Inventors: Hirokazu Takeuchi, Otsu (JP); Nobuo Funabiki, Otsu (JP); Sotohiro Nakajima, Otsu (JP)

(73) Assignee: Nippon Electric Glass Co., Ltd., Shiga-ken (JP)

( * ) Notice: Subject to any disclaimer, the term of this patent is extended or adjusted under 35 U.S.C. 154(b) by 1 day.

(21) Appl. No.: 11/589,048

(22) Filed: Oct. 30, 2006

(65) Prior Publication Data

US 2007/0104424 A1 May 10, 2007

(30) Foreign Application Priority Data

Nov. 8, 2005 (JP) ............................. 2005-323824

(51) Int. Cl.
*G02B 6/38* (2006.01)
*G02B 6/36* (2006.01)
(52) U.S. Cl. .............................. 385/72; 385/65; 385/83
(58) Field of Classification Search ................... 385/65, 385/83, 52, 72
See application file for complete search history.

(56) References Cited

U.S. PATENT DOCUMENTS

| 5,199,966 | A | 4/1993 | Harvey et al. |
| 5,611,014 | A * | 3/1997 | Basavanhally ............... 385/90 |
| 6,859,588 | B2 * | 2/2005 | Kim et al. ..................... 385/49 |
| 2005/0031831 | A1 | 2/2005 | Bullesfeld et al. |
| 2005/0129380 | A1 | 6/2005 | Takeuchi et al. |

\* cited by examiner

*Primary Examiner*—Charlie Peng
(74) *Attorney, Agent, or Firm*—Wenderoth, Lind & Ponack, L.L.P.

(57) ABSTRACT

An object of the present invention is to very accurately position and align a plurality of optical fibers in each groove of a substrate for an optical fiber array, without leading to inappropriate upsizing and complication of an apparatus and increase in cost. To achieve the object, an optical-fiber aligning part 3 of a substrate 1 is formed, in parallel, with a plurality of grooves 2 at least on the top thereof, the plurality of grooves retaining and aligning a plurality of optical fibers 5. A cross section perpendicular to a longitudinal direction of the grooves 2 is recessed at a center portion of the top in the widthwise direction, and depths A of the grooves 2 provided at the center portion are shallower than depths A of the grooves 2 provided at both ends in the widthwise direction.

5 Claims, 10 Drawing Sheets

SUBSTRATE FOR OPTICAL FIBER ARRAY AND METHOD FOR FABRICATING THE SAME

FIELD OF THE INVENTION

The present invention relates to a substrate for an optical fiber array and a method for fabricating the same, in particular to a substrate for an optical fiber array having an optical-fiber aligning part, which is formed, in parallel, with a plurality of grooves retaining and aligning a plurality of optical fibers, and a method for fabricating the same.

BACKGROUND OF THE INVENTION

In recent years, with an increase in capacity, speed or the like of a optical communication network, a substrate for an optical fiber array (hereinafter also referred to as a substrate) is frequently being used as a component constituting an optical splitter which branches one optical fiber into many (e.g., eight) optical fibers, an optical branching filter which branches light in each wavelength region, and even an optical switch which changes light direction, or the like. Such substrate is made of glass, resin or the like, and has an optical-fiber aligning part on which a plurality of grooves (generally V-grooves) retaining and aligning the plurality of optical fibers are formed in parallel.

Conventionally, such a substrate is fabricated by the pressing of glass material (see e.g., Patent Document 1), injection molding of resin material, grinding/polishing of a plate body made of these materials, or anisotropic etching of a plate body made of single-crystal silicon, or the like. However, the above mentioned pressing process requires a precise polish-finishing of the V-grooves so as to obtain a predetermined dimensional tolerance, and thus causes an increase in cost. The grinding/polishing process causes an increase in the number of processes and the complication operation, and hence a decrease in yield. The anisotropic etching is unsuitable for mass production because of high material and equipment cost and a long processing time. Thus, all the methods described above have serious problems and are unsuitable for fabricating the aforementioned substrate.

In order to deal with such problems, Patent Documents 2 and 3 set forth below for example, disclose forming a reduced substrate having a similar shape by heating/softening a preform (glass base material) and then drawing it (also referred to as stretching and forming). Specifically, according to Patent Document 2, the height between the V-grooves at the center portion of the preform and the V-grooves provided at locations other than the center in the widthwise direction differs because of the forming of a recess, at the center portion in the widthwise direction, caused by a slight stretch of the surface of the preform on which the V-grooves are formed, due to heating/softening. In order to avoid such height difference, the preform is formed such that a cross section of the side surfaces (a cross section perpendicular to the longitudinal direction of the V-grooves) presents a projecting R shape, and a through hole is formed within the preform. Patent Document 3 discloses that when heating a preform using a radiation source having at least one infrared radiation apparatus or the like, heat is uniformly applied to the entire preform to be drawn by using a radiation source with a spectral distribution such that at most half of the power is absorbed into the preform while passing through the preform.

[Patent Document 1] JP No. 4-296802A

[Patent Document 2] JP No. 2004-86151A

[Patent Document 3] Japanese Translation No. 2005-505482A of PCT International Application

SUMMARY OF INVENTION

In the method for fabricating the substrate disclosed in the above Patent Document 2, it is expected that not only heat will be uniformly applied to the side surfaces of the preform, but by controlling the pressure of a through hole within the preform to be higher than atmosphere pressure during drawing, a recess at the center portion of the surface on which the V-grooves are formed in the widthwise direction will also be corrected, and the height differences between the V-grooves at the center portion and the V-grooves provided at locations other than the center portion in the widthwise direction will be reduced.

However, even according to the fabricating method disclosed in Patent Document 2, an apparatus controlling the internal pressure of the through hole is required, and this makes the drawing apparatus larger and more complicated and hence leads to an increase in cost. Moreover, adjusting the internal pressure to an appropriate value would be difficult or complicated. In addition, even when the recess at the center portion of the surface in the widthwise direction is being corrected by increasing the internal pressure of the through hole in such a manner, it can be assumed that only part of the surface is likely to be corrected and will be difficult to make the entire surface flat.

Therefore, all the height differences between the V-grooves provided at the center portion and those provided at locations other than the center portion of the substrate fabricated by the method are not always appropriately reduced. As a result, the substrate may not only generate inappropriate height variations in the plurality of optical fibers, which are retained and aligned in the V-grooves, but pitch deviation (adjacent pitch deviation) of each V-groove may also increase. In particular, due to the demand for cut in loss of light transmission or the like in recent years, optical fibers retained in the grooves of the substrate are required to be positioned and aligned with a higher degree of accuracy than before, and thus the problems of height difference and pitch deviation of the grooves, as described above, become significant.

According to the fabricating method disclosed in the above Patent Document 3, since the entire preform is uniformly heated during the drawing, it will be effective for suppressing the deformation of the surface.

However, even the fabricating method disclosed in the Patent Document 3 requires a very large and complicated apparatus in order to heat the entire preform uniformly, and thus leading to an increase in cost, and very tedious and complicated adjustment of temperature. In addition, taking into consideration the fact that the preform is affected by surface tension during the heating/softening thereof, it is difficult to ensure that the forming of a recess at the center portion of the surface in the widthwise direction can positively be avoided by merely heating the entire preform uniformly as described above. Therefore, it is very difficult for the method to satisfy the recent severe requirements for reducing height difference or pitch deviation of the plurality of V-grooves provided on a surface as much as possible, so that light transmission losses is reduced to substantially zero.

In light of the above problems, the present invention has a technical object of very accurately positioning and aligning a plurality of optical fibers in each groove of a substrate for an optical fiber array, without leading to inappropriate upsizing complication of an apparatus and increase in cost.

The present invention for solving the aforementioned technical problems is characterized by a substrate for an optical fiber array having an optical-fiber aligning part formed with, in parallel, a plurality of grooves retaining and aligning a plurality of optical fibers at least on the top, where a cross section perpendicular to a longitudinal direction of the grooves of the optical-fiber aligning part is such that the center portion of the top-surface in a widthwise direction is recessed, and depths of grooves provided at the center portion are shallower than those provided at both ends in the widthwise direction.

With such structure, even when the center portion in the widthwise direction of the optical-fiber aligning part of the substrate is recessed due to simplification of fabricating method, it is possible to accurately position a plurality of optical fibers retained in each groove by changing the depth of the grooves in accordance with positions of the substrate in the widthwise direction. Specifically, since the optical-fiber aligning part of the substrate is formed such that the center portion of the top-surface in the widthwise direction is recessed, while the depths of the grooves provided at the center portion are relatively shallower and the depths of the grooves provided at the both ends in the widthwise direction are relatively deeper, a height difference of the plurality of optical fibers retained in the grooves can be effectively reduced. In this case, it is preferable to change the depths of the plurality of grooves according to the shape of the top-surface. When the top-surface has a shape such that the center portion of the top-surface in the widthwise direction is most deeply recessed while the degree of recess gradually decreases toward both ends of the top-surface, the plurality of grooves are preferably formed such that the depths gradually increase from the center portion toward both ends in the widthwise direction. In addition, when fabricating the substrate having the optical-fiber aligning part of which top-surface is recessed at the center portion in the widthwise direction, there is no need to use such large and complicated apparatus, which applies heat to the entire preform as uniformly as possible during the drawing of the substrate, so described in the conventional art (art disclosed in Patent Document 3) or the like, thus an advantage in terms of cost and maintenance. Note that this structure of the substrate is suitable for the case where a fabricating method including drawing of a preform is used, but the substrate may also be fabricated by any method. For example, the case where the substrate is fabricated using an apparatus that uniformly heats the entire preform during drawing is also not excluded (this is also true for other substrates set forth below). The number of grooves formed on the substrate is not particularly limited, but no less than four or eight and no more than 16 or 32 grooves are preferable (this is also true for other substrates set forth below).

Moreover, with the aforementioned structure, when the length of a straight line connecting the deepest bottom part of each groove is used as the standard pitch length, pitch lengths between the grooves provided at the center portion can be shorter than those between the grooves provided at both ends of the top-surface in the widthwise direction. Further, the pitch length between each groove can be the same as or longer than the pitch between positions of the central axes of the optical fibers retained in the grooves. The deepest bottom part of the groove refers to an intersection point of the extended straight lines of the inner surface of the groove.

In the aforementioned substrate, the plurality of grooves may also be provided in parallel at the bottom of the optical-fiber aligning part.

In doing so, the plurality of optical fibers can be retained and aligned not only on the top of the optical-fiber aligning part of the substrate but also on the bottom, and thus the substrate can be appropriately adapted to an increase in capacity and speed of an optical communication network. Under such usage, the plurality of grooves provided on the bottom of the optical-fiber aligning part preferably have the same structure as the grooves provided on the top previously described.

When the widthwise dimension of the optical-fiber aligning part is longer than 5/3 times of the thickness-direction dimension, which is defined from the top-surface to the bottom-surface, the plurality of grooves are preferably formed on both top-surface and bottom-surface of the optical-fiber aligning part as described above.

This becomes advantageous when the method for fabricating the substrate includes drawing of a preform. Specifically, when the widthwise dimension of the optical-fiber aligning part of the substrate is significantly longer than the thickness of the substrate, i.e., when the optical-fiber aligning part is relatively thin, the top-surface, of which the surface area is increased due to the formation of the large grooves, extends due to heating/softening during the drawing of the preform having a shape corresponding to such optical-fiber aligning part and on which only the top is provided with a plurality of large grooves. As a result, the entire optical-fiber aligning part is curved and deformed such that the center portion of the top in the widthwise direction is projected, and thus causing a bend. Such event tends to become prominent when the widthwise dimension of the optical-fiber aligning part is 5/3 or twice longer than the thickness-direction dimension. In the case of such kind of optical-fiber aligning part, bending of optical-fiber aligning part, of which the center portion of the top in the widthwise direction is projected due to the drawing accompanied by heating/softening, can be avoided by forming a plurality of grooves on the bottom thereof. In this case, the center portions of both the top and the bottom of the optical-fiber aligning part in the widthwise direction are recessed. When the widthwise dimension of the optical-fiber aligning part is not more than twice, preferably no more than 5/3 times of the thickness-direction dimension, even when the plurality of grooves are formed only on the top, the optical-fiber aligning part is very unlikely to be bended such that the center portion of the top in the widthwise direction is projected due to the drawing. In addition, the center portions of both top and bottom of the optical-fiber aligning part in the widthwise direction tend to be recessed.

In the aforementioned structure of the substrate, the height difference of the plurality of grooves provided on at least the top of the optical-fiber aligning part is preferably less than ±0.2 μm. In other words, the substrate is preferably formed such that the height difference of the central axes of the optical fibers retained in the plurality of grooves is less than ±0.2 μm.

Accordingly, when the substrate with the aforementioned structure is used as a component constituting the previously described optical splitter, optical branching filter, and optical switch or the like, light can be efficiently transmitted, and such substrate is very favorable for achieving an increase in capacity of the optical communication network. In addition, conventional fabricating methods (e.g., the methods disclosed in Patent Documents 1, 2, and 3) can only achieve a height difference of about ±0.5 μm, but by using the fabricating method invented by the present inventors and set forth below, the height difference can be reduced to be less than ±0.2 μm (preferably less than ±0.1 μm).

The method according to the present invention, which can be used to solve the aforementioned technical problem, is a method for fabricating a substrate for an optical fiber array including a step of continuously forming an optical-fiber aligning part by drawing a preform, characterized by fabricating a preliminary preform, the preliminary preform formed with a plurality of large grooves, which correspond to a plurality of ideal grooves for the optical-fiber aligning part obtained after the drawing and are relatively large, at least on the top, by detecting a difference between the state of the plurality of grooves of a preliminary optical-fiber aligning part obtained by drawing the preliminary preform and the state of the plurality of ideal grooves, and by fabricating a preform, the preform being formed by correcting the state of the plurality of large grooves based on the detected result. Here, the "state of grooves" refers to where the central axis of an imaginary circle showing a cross section of the optical fiber retained in the grooves is located, and the "plurality of ideal grooves" refers to the plurality of grooves in which the plurality of optical fibers may be very accurately positioned and retained.

According to the method, the optical-fiber aligning part is not merely formed by drawing the preform on which the plurality of ideal large grooves are formed such as in the conventional art. The difference between the state of the plurality of grooves of the preliminary optical-fiber aligning part obtained by drawing such preform and the state of the plurality of ideal grooves of the optical-fiber aligning part, e.g., difference in height or pitch of each groove caused by distortion of the plurality of grooves in an orientation, is detected. A preform formed by correcting the state of the plurality of large grooves based on the detected result is then fabricated, and the preform is subjected to drawing to obtain the final optical-fiber aligning part. Since the preform that is actually being used is fabricated by taking into consideration inappropriate deformation rather than reasonably reducing deformation generated during the drawing of the ideal preliminary preform, the final optical-fiber aligning part obtained is not significantly affected by the inappropriate deformation caused by the drawing. As a result, the state of the plurality of grooves of the final optical-fiber aligning part obtained becomes very close to the state of the plurality of ideal grooves, the plurality of optical fibers retained in the grooves may be accurately positioned, and a substrate exhibiting high-quality light transmission and light connection can be obtained. In addition, inappropriate upsizing or complication of the drawing apparatus can be avoided with such fabricating method, thus achieving lower manufacturing cost. In the fabricating method, it is preferable that the aforementioned corrected preform is heated and drawn to have a viscosity of $10^3$ to $10^8$ dPa•s as to obtain the final optical-fiber aligning part.

In this case, the steps of fabricating the preform by further drawing the corrected preform, detecting a difference between the state of the plurality of grooves of the obtained optical-fiber aligning part and the state of the plurality of ideal grooves, and further correcting the state of the plurality of large grooves based on the detected result may be repeated more than once.

In other words, when the preform is fabricated by further drawing the preform formed by correcting the above preliminary preform, detecting the difference between the state of the plurality of grooves of the obtained optical-fiber aligning part and the state of the plurality of ideal grooves, and further correcting the state of the plurality of large grooves based on the detection result, an optical-fiber aligning part of which the state is more close to the state of the plurality of ideal grooves can be obtained. In addition, when the step of correcting the state of the plurality of large grooves of the preform is carried out for several times (multiple times), an ideal optical-fiber aligning part can be made.

In the aforementioned method, the preform obtained in the end by the correction preferably has large grooves such that the depths of the large grooves provided at the center portion are shallower than the depths of the grooves provided at both ends in the widthwise direction.

With such structure, as previously described, even when the final optical-fiber aligning part obtained has a recessed center portion at the top in the widthwise direction due to the drawing accompanied by heating/softening, the depths of the grooves provided at the center portion are relatively shallower and the depths of the grooves provided at both ends in the widthwise direction are relatively deeper. Therefore, the height difference of the plurality of optical fibers retained in the grooves becomes extremely small and the optical fibers can be accurately positioned.

Moreover, in the preform obtained in the end by the correction, it is preferable that pitches between the large grooves provided at the center portion are shorter than those between the large grooves provided at both ends in the widthwise direction.

With such structure, as previously described, even when the final optical-fiber aligning part obtained has a recessed center portion at the top in the widthwise direction due to the drawing accompanied by heating/softening, position deviation (misalignment from the ideal origin) of the central axis of the imaginary circle, which indicates the cross section of the plurality of optical fibers retained in the grooves, become very small, thus allowing accurate positioning of the optical fibers. Specifically, the deviations can be ±0.08% of the average distance between the central axes of the plurality of optical fibers. In particular, this is effective for the case where the pitch between the central axes of the optical fibers is more than 130 μm, and where the effect of reducing the deviations is significant. The aforementioned ideal origin is determined as follows. First, assume that n optical fibers are arranged in n V-grooves. The positions $(X1, Y1), \ldots, (Xn, Yn)$ of the central axes of the optical fibers are determined and a straight line is determined from these points using a least square method. Coordinates $(X1, Y1), \ldots, (Xn, Yn)$ are converted into $(X'1, Y'1), \ldots, (X'n, Y'n)$ using the straight line as an X' axis. Next, the coordinates $(X'1, Y'1), \ldots, (X'n, Y'n)$ are moved in parallel (offset) along a Y'-axis such that the absolute values of the maximum value and the minimum value are equal in $Y'1, \ldots, Y'n$. Then, n points with an ideal pitch (e.g., 250 μm) arranged on the X'-axis are rearranged such that the absolute values of the maximum value and the minimum value among the differences along the X'-axis between these points and X'1 to X'n corresponding to them are equal. The rearranged points are set at the aforementioned ideal origins $(Xil, Yil), \ldots, (Xin, Yin)$.

Moreover, in the preliminary preform, the plurality of large grooves formed at least on the top to have substantially the same size and substantially the same shape with respect to the surface, which is a plane, are preferably formed with substantially the same pitch.

With such structure, it is possible to easily and accurately fabricate the preliminary preform having, on the top, the plurality of large grooves which correspond to the plurality of ideal grooves of the optical-fiber aligning part obtained by the drawing. The preliminary preform is fabricated only such that each groove has substantially the same size, shape and pitch with respect to the surface, which is a plane. Thus, a complicated process or the like is not needed and the fabrication of the preliminary preform is favorable for achieving the ideal state size of each groove accurately.

As described above, according to the substrate for the optical-fiber aligning part related to the present invention, the optical-fiber aligning part of the substrate is formed such that the depths of the grooves provided at the center portion are relatively shallower and those of the grooves provided at both ends in widthwise direction are relatively deeper, with the center portion on the top-surface in the widthwise direction being recessed. Therefore, the height difference of the plurality of optical fibers retained in these grooves can be effectively reduced, thereby enhancing the accuracy of the positioning of optical fibers. In addition, when the substrate having the optical-fiber aligning part of which the center portion of the top-surface is recessed in the widthwise direction is formed in such manner, there is no need to use such large and complicated apparatus that applies heat to the entire preform as uniformly as possible during the drawing of the substrate as shown in, for example, the conventional art (art described in Patent Document 3), and hence having an advantage in terms of cost and maintenance.

Moreover, according to the method for fabricating the substrate for the optical-fiber aligning part related to the present invention, the preform that is actually used is fabricated by taking into consideration the inappropriate deformation rather than the reasonably reducing deformation generated during the drawing of the preliminary preform on which the plurality of ideal large grooves are formed. Thus, the final optical-fiber aligning part obtained is not significantly affected by the inappropriate deformation generated during the drawing. As a result, the plurality of grooves of the final optical-fiber aligning part obtained is in a state very close to that of the plurality of ideal grooves, and the plurality of optical fibers retained in the grooves can be positioned very accurately. In addition, according to such fabricating method, an inappropriately large and complicated drawing apparatus can be avoided and hence the lowering in manufacturing cost can also be achieved.

DETAILED DESCRIPTION OF THE INVENTION

Hereinafter, embodiments of the present invention will be described with reference to the attached drawings.

Figure 1:
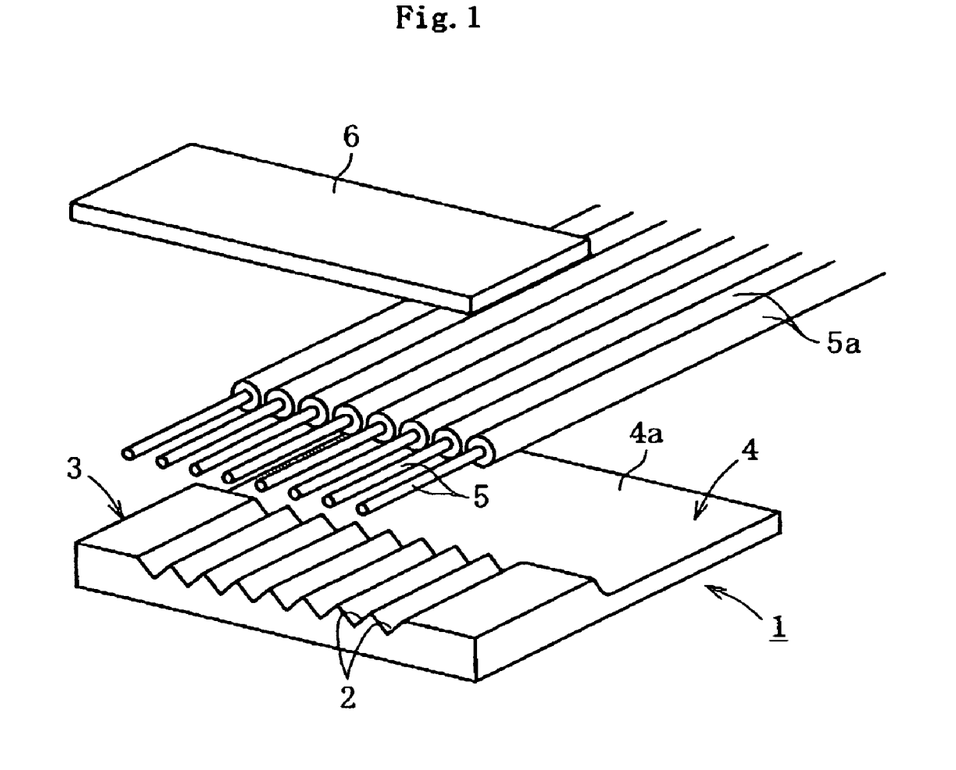
FIG. 1 is a perspective view showing a schematic structure of a substrate for an optical fiber array according to an embodiment of the present invention and an optical fiber retained on the substrate.

First, a schematic structure of a substrate 1 for an optical fiber array related to an embodiment of the present invention will be described with reference to FIG. 1. As shown in FIG. 1, the substrate 1 is composed of an optical-fiber aligning part 3, of which the top is provided with a plurality of (eight in FIG. 1) straight grooves (V-grooves (V-grooves) 2, and a terrace 4 formed adjacent to the optical-fiber aligning part 3 and having a flat surface 4a lower than the bottom of the V-grooves 2. In addition, a plurality of optical fibers 5 are arranged in the plurality of V-grooves 2 of the optical-fiber aligning part 3. Coating part 5a of each optical fiber 5 is provided on the flat surface 4a of the terrace 4, and a pressing plate 6 is mounted from above with each optical fiber 5 being arranged in the V-grooves 2, and these are adhered by an adhesive agent or the like. In this case, the substrate 1 is made of a glass or a crystallized glass formed by precipitating crystal from an amorphous glass.

Figure 2:
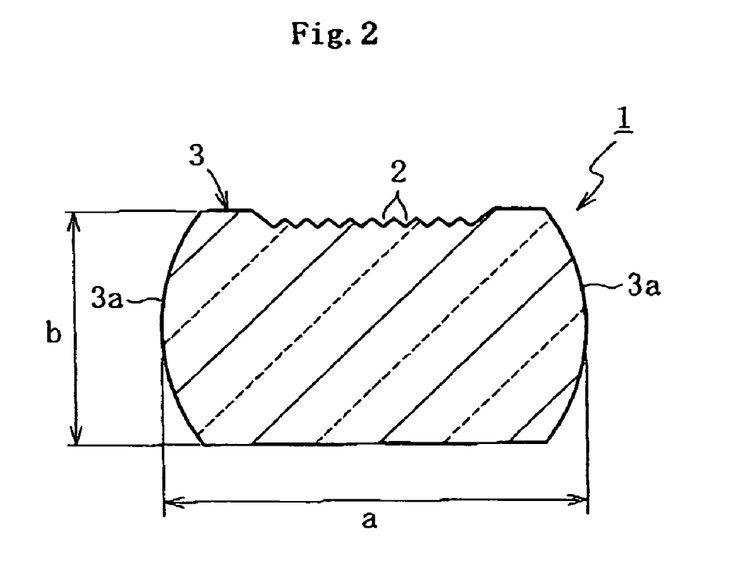
FIG. 2 is a front view of the substrate for the optical fiber array.
Figure 3:
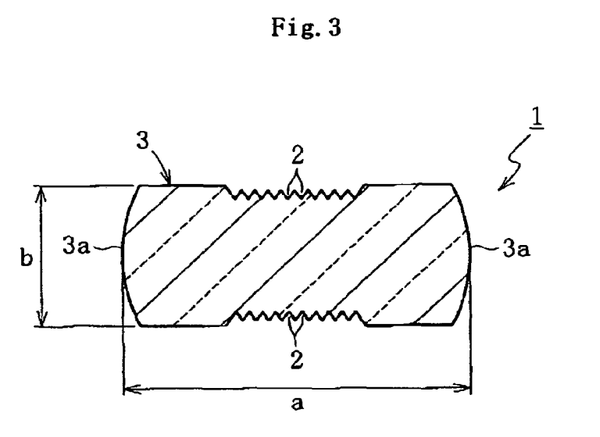
FIG. 3 is a front view showing another example (an example in which groove formation portions are present on both the top and the bottom) of the substrate for the optical fiber array.

FIG. 2 and FIG. 3 show perpendicular cross sections of the optical-fiber aligning part 3 of the substrate 1 in the longitudinal direction of the V-grooves 2. The substrate 1 may be a substrate with which only the top of the optical-fiber aligning part 3 is provided with the V-grooves 2 as shown in FIG. 2, or a substrate with which both the top and the bottom of the optical-fiber aligning part 3 are provided with the V-grooves 2 as shown in FIG. 3. In this case, the optical-fiber aligning part 3 shown in FIG. 2 has a widthwise dimension a that is 5/3 times a thickness-direction dimension b, while the optical-fiber aligning part 3 shown in FIG. 3 has a widthwise dimensions a that is 7/3 times a thickness-direction dimension b. In addition, both side surfaces 3a of the optical-fiber aligning part 3 are convex-curve surfaces (preferably convex-arc surfaces).

Figure 4:
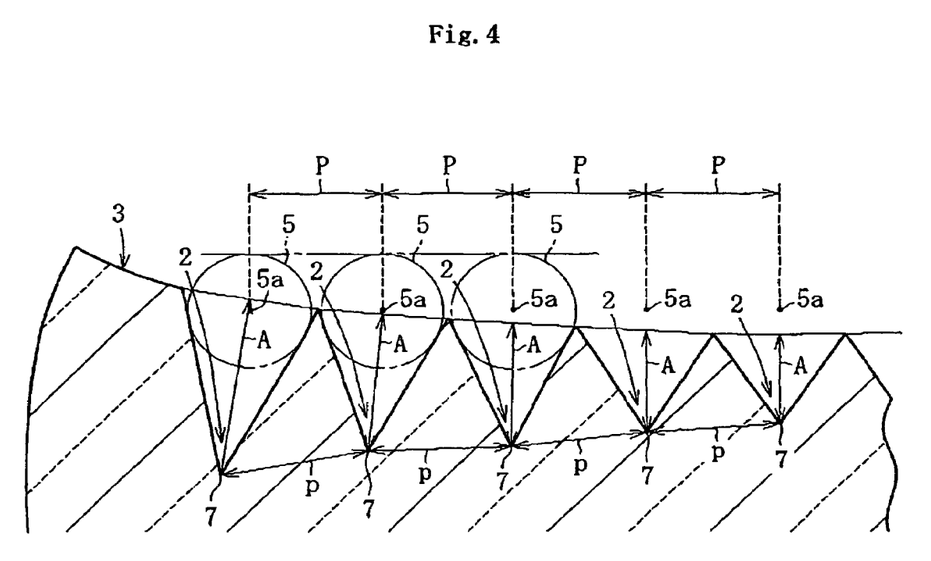
FIG. 4 is an expanded partial front view showing the top portion of the substrate for the optical fiber array.

FIG. 4 is an enlarged and exaggerated illustration showing a perpendicular cross section (cross section of the top portion) of the aforementioned two kinds of optical-fiber aligning parts 3 in the longitudinal direction of the V-grooves 2. As shown in FIG. 4, the optical-fiber aligning part 3 has a recessed center portion in the widthwise direction. Specifically, the recession is the greatest at the center portion in the widthwise direction and gradually decreases toward both ends in the widthwise direction. A depth A of the V-groove 2 provided at the center portion is shallower than a depth A of the V-grooves 2 provided at both ends in the widthwise direction. Specifically, the depth A gradually becomes deeper from the center portion toward both ends in the widthwise direction. In addition, when the length of the straight lines connecting the deepest bottom part 7 of each V-groove 2 is used as the standard pitch length, a pitch p between the V-grooves 2 provided at the center portion is shorter than a pitch p of the V-grooves 2 provided at both ends in the widthwise direction. Specifically, the pitch p between the V-grooves 2 gradually becomes longer from the center portion toward both ends in the widthwise direction. In addition, the pitch p between the V-grooves 2 is the same as or longer than an array pitch P of the optical fibers 5 (distance between central axes 5a of the optical fibers 5).

Figure 5:
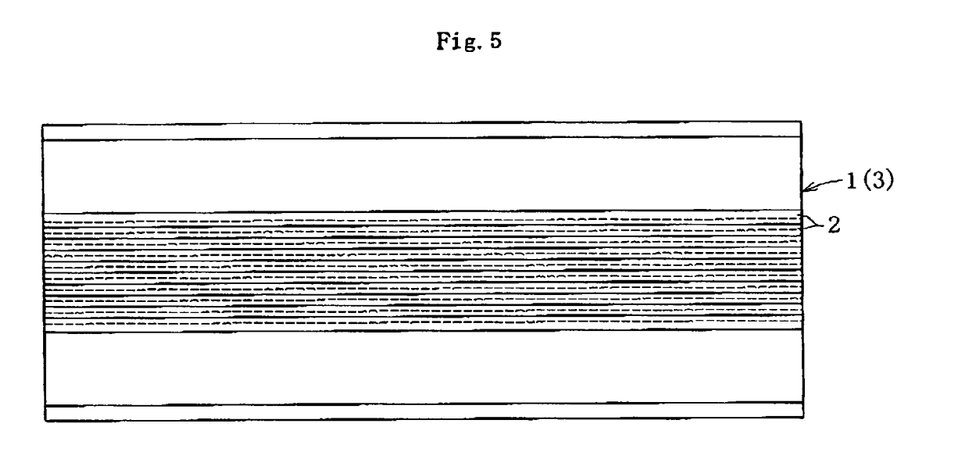
FIG. 5 is a plan view showing another example (an example in which no terrace is present) of the substrate for the optical fiber array.

With such structure, a height difference of the optical fibers 5 retained in the V-grooves 2 becomes very small. The structure similar to the above structure can be employed for the plurality of V-grooves 2 provided at the bottom of the optical-fiber aligning part 3 shown in FIG. 3. In addition, as shown in FIG. 5, the structure similar to the above structure can also be employed for the substrate 1 without any terrace, therefore the substrate 1 composed of only the optical-fiber aligning part 3.

Figure 6:
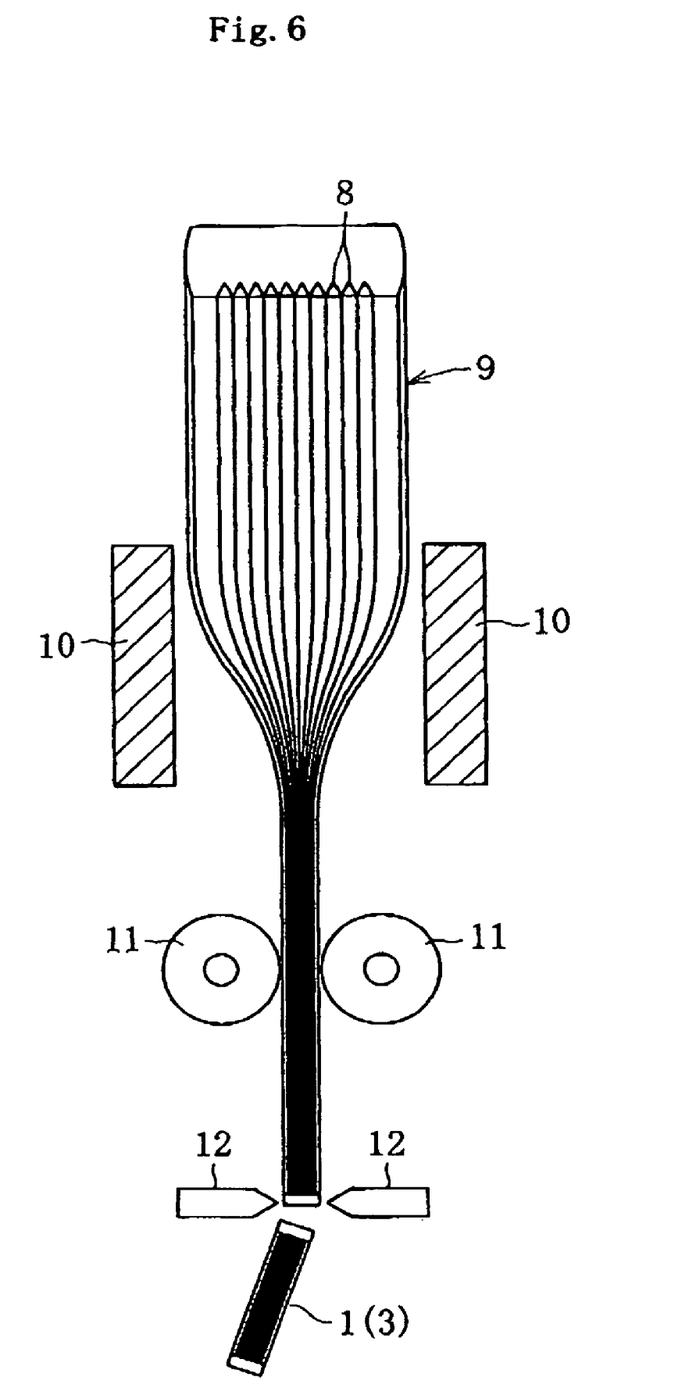
FIG. 6 is a schematic diagram showing a state in which the substrate for the optical fiber array is being fabricated.

Next, a method for fabricating the substrate 1 having the optical-fiber aligning part 3 with the aforementioned structure will be described. In this case, as shown in FIG. 6, the substrate 1 is fabricated by drawing a preform 9, on which the top (or both the top and the bottom) is formed with a plurality of large grooves (large V-grooves) 8, with a pair of rollers 11 while being heated by a heater 10, and then cutting into a predetermined length with a cutter 12. Thereafter, a process for forming the terrace 4 is carried out as appropriate.

Figure 7:
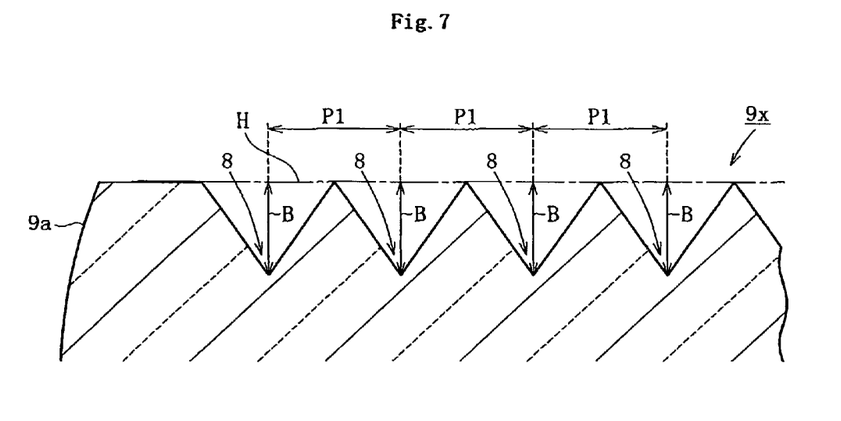
FIG. 7 is an expanded partial front view of a preliminary preform used in a preliminary step during fabrication of the substrate for the optical fiber array.

Regarding a specific fabricating process, first, as a preliminary step, a preliminary preform formed with the plurality of large V-grooves, which correspond to the plurality of ideal V-grooves for the optical-fiber aligning part, is fabricated. In this embodiment, a preliminary preform 9X, formed with the plurality of large V-grooves 8 having substantially the same dimension (same depth B) and the same shape with substantially the same pitch P1, is fabricated using a flat surface H as the standard, as shown in FIG. 7. Both side surfaces 9a of the preliminary preform 9X are convex curved surfaces (preferably convex-arc surfaces) so that heat is uniformly applied to the side surfaces by the heater 10.

Figure 8:
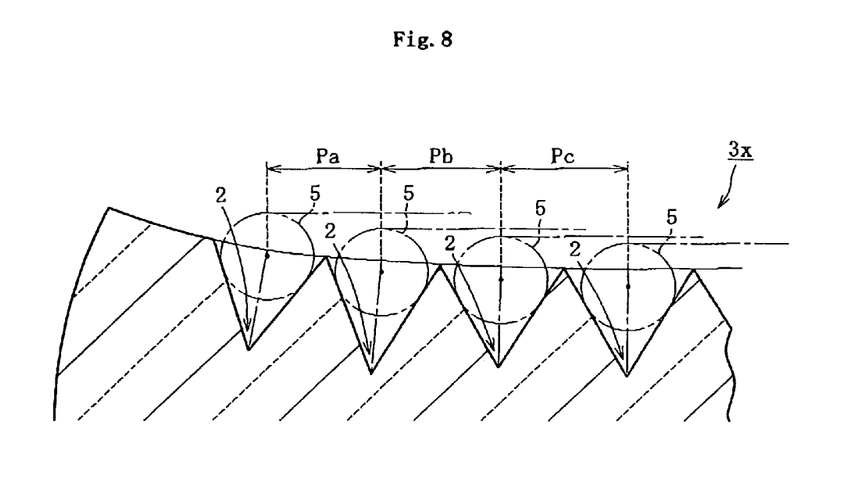
FIG. 8 is an expanded partial front view of a preliminary optical-fiber aligning part obtained by drawing the preliminary preform.

Next, a preliminary optical-fiber aligning part 3X of the substrate 1 is obtained by drawing the preliminary preform 9X in such a manner shown in FIG. 6. As shown in FIG. 8, the center portion of the top-surface of the preliminary optical-fiber aligning part 3X in the widthwise direction is recessed due to the heating/softening during the drawing. In addition, since the center portion of the top-surface is drawn out and extended in the widthwise direction, pitch Pa, Pb, Pc, . . . between each V-groove 2 becomes relatively longer at the center portion and relatively shorter at both ends of the top-surface in the widthwise direction. Moreover, the height difference of the optical fibers 5 retained in the V-grooves 2 becomes relatively smaller at the center portion and relatively larger at both ends in the widthwise direction.

Figure 9:
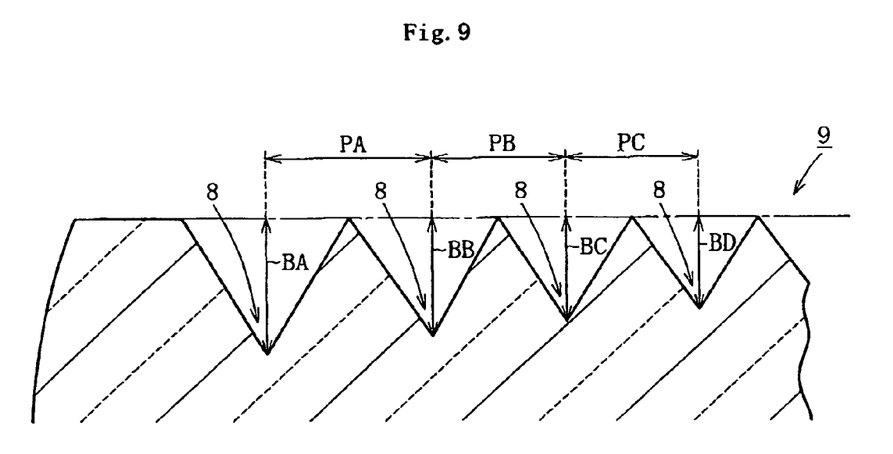
FIG. 9 is an expanded partial front view of a preform actually used in fabrication of the substrate for the optical fiber array.

Next, deviations of pitch between each V-groove 2 and height difference of the optical fibers 5 are measured, and a corrected preform 9 is fabricated by taking into consideration the measured results and a rate of reduction caused by the drawing such that the deviations of pitch and the height difference do not occur after the drawing. The corrected preform 9 is formed such that pitch PA, PB, PC, . . . between each large V-groove 8 becomes relatively shorter at the center portion and relatively longer at both ends in the widthwise direction and depth Ba, BB, BC and BC of each V-groove 2 becomes relatively shallower at the center portion and relatively deeper at both ends in the widthwise direction, as shown in FIG. 9.

The corrected preform 9 is subjected to drawing in the manner shown in FIG. 6, thus obtaining the optical-fiber aligning part 3 of the substrate 1 having the previously mentioned cross section shown in FIG. 4—in other words the cross section with extremely small pitch variation between each V-groove 2 and extremely small height difference of the optical fibers 5 retained in each V-groove 2.

EXAMPLES

Figure 10:
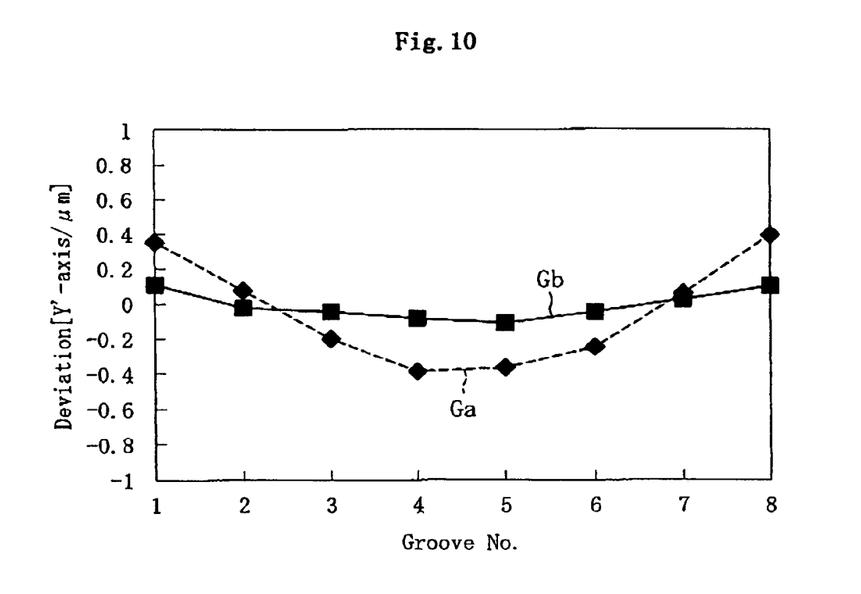
FIG. 10 is a graph showing deviations of a plurality of grooves on the substrate for the optical fiber array along a Y'-axis.
Figure 11:
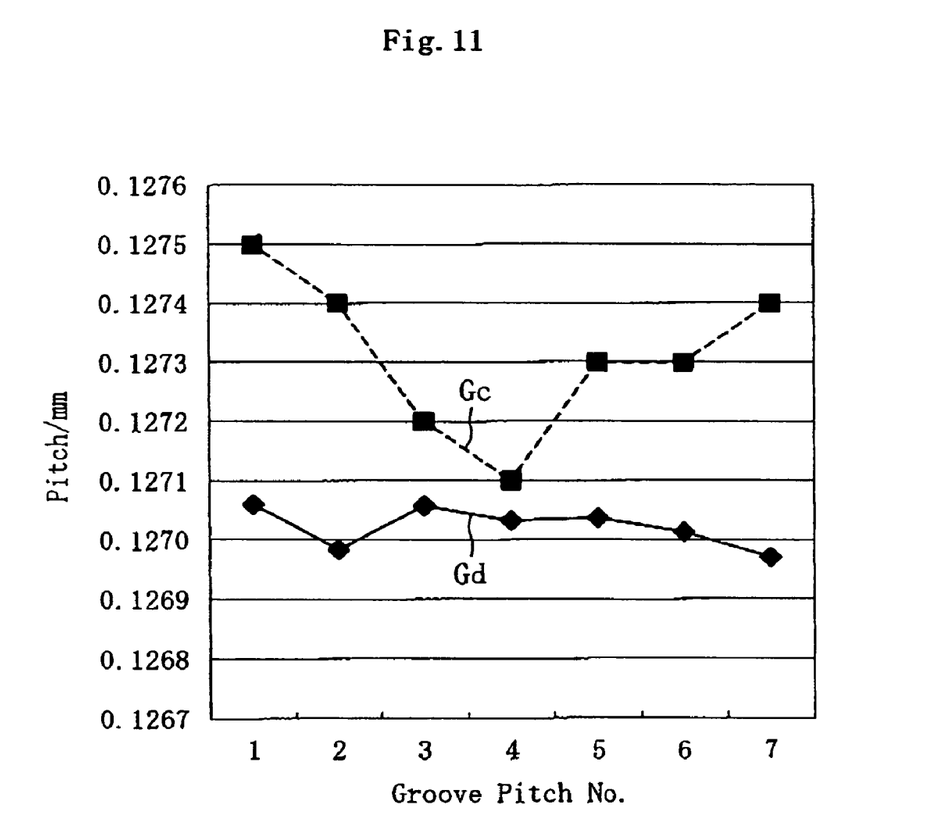
FIG. 11 is a graph showing pitch between each groove on the substrate for the optical fiber array.

In Example 1 of the present invention, in order to fabricate an eight-fiber substrate (optical-fiber aligning part) having a widthwise-direction dimension of 4 mm, a thickness-direction dimension of 1 mm, and pitch between each groove of 127 μm, a preliminary preform composed of eight large V-grooves all having the same depth was fabricated, and the preliminary preform was drawn while being heated by the heater such that viscosity reaches $10^3$ to $10^8$ dPa•s. In the obtained optical-fiber aligning part of the substrate, the central axes of the optical fibers arranged in the V-grooves at the center portion were about 0.8 μm lower than those arranged in the V-grooves at both ends thereof in the widthwise direction, as shown by the dotted characteristic curve Ga in FIG. 10. Each deviation amount of the positions of the central axes of the optical fibers arranged in the eight V-grooves is divided by the rate of reduction caused by the drawing, and a preform corrected by only the amounts corresponding to the divided values is fabricated. After the corrected preform was drawn again, the obtained optical-fiber aligning part was improved so that the central axes of the optical fibers arranged in the V-groove at the center portion were 0.2 μm lower than those arranged in the V-grooves at both ends thereof in the widthwise direction, as shown by the solid characteristic curve Gb in FIG. 10. Note that each point on the characteristic curves Ga and Gb denotes the amount of deviation from the aforementioned ideal origin of the central axis of the optical fiber arranged in each V-groove along the Y'-axis (axis perpendicular to the X'-axis). In addition, the optical-fiber aligning part was formed such that the pitches between the deepest bottom parts of the V-grooves at the center portion were relatively shorter and the pitches between the deepest bottom parts of the V-grooves at both ends thereof were relatively longer in the widthwise direction, as shown by the dotted characteristic curve Gc in FIG. 11. Moreover, the optical-fiber aligning part was formed such that the pitches between the deepest bottom parts of the V-grooves were longer than those of the central axes of the optical fibers shown by the solid characteristic curve Gd in FIG. 11.

Figure 12A:
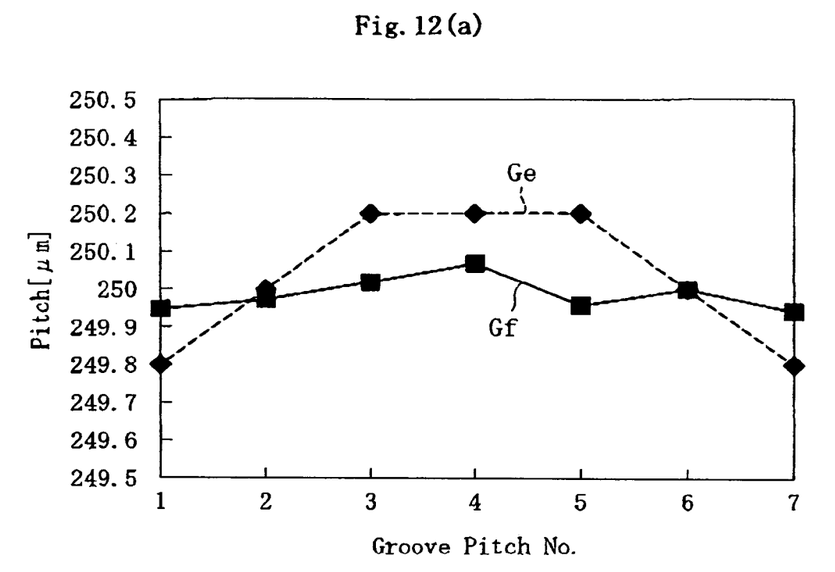
FIG. 12(a) is a graph showing adjacent pitch variation of the plurality of grooves on the substrate for the optical fiber array.
Figure 12B:
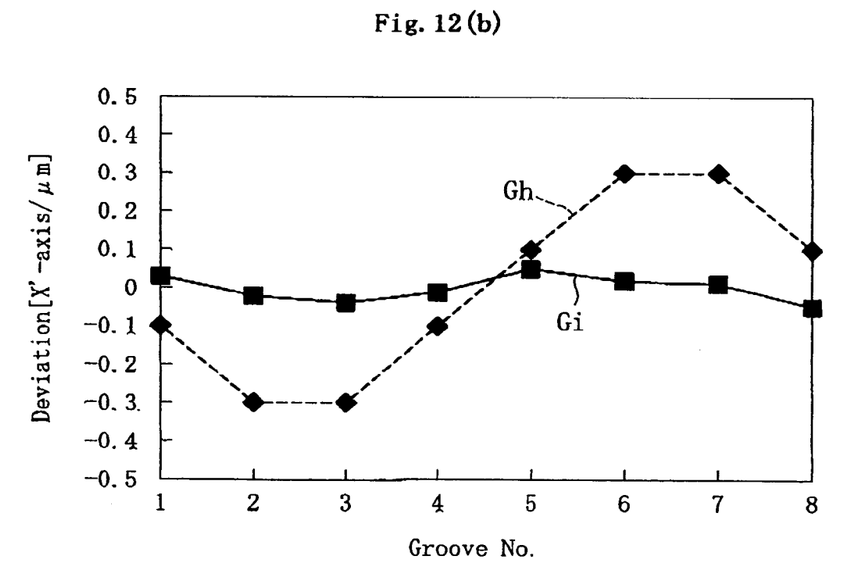
FIG. 12(b) is a graph showing deviations of the plurality of grooves along an X'-axis.

In Example 2 of the present invention, in order to fabricate an eight-fiber substrate (optical-fiber aligning part) having a widthwise-direction dimension of 3.75 mm, a thickness-direction dimension of 1.2 mm, and pitch between each groove of 250 μm, a preliminary preform composed of eight large V-grooves all having the same pitch was fabricated, and the preliminary preform was drawn while being heated by the heater such that viscosity reaches $10^3$ to $10^8$ dPa•s. In the obtained optical-fiber aligning part of the substrate, the pitches of the central axes of the optical fibers between the V-grooves at the center portion arc about 0.4 μm longer than the pitches of the central axes of the optical fibers between the V-grooves at both ends thereof in the widthwise direction, and the adjacent pitch variation was between about ±0.2 μm, as shown in the dotted characteristic curve Ge in FIG. 12(a). Each point on the characteristic curves Gh and Gi shown in FIG. 12 (b) denotes the amount of deviation from the ideal origin of the central axis of the optical fibers arranged in each V-groove along the X'-axis. The deviation amount of the pitches of the eight V-grooves is divided by the rate of reduction caused by the drawing, and a preform corrected by only the amounts corresponding to the divided values is fabricated. After the corrected preform was drawn again, the obtained optical-fiber aligning part was improved so that the adjacent pitch variation was between about ±0.1 μm as shown by the solid characteristic curve Gf in FIG. 12(a) and the amount of deviation was between about ±0.05 μm as shown by the solid characteristic curve Gi in FIG. 12(b).

Figure 13A:
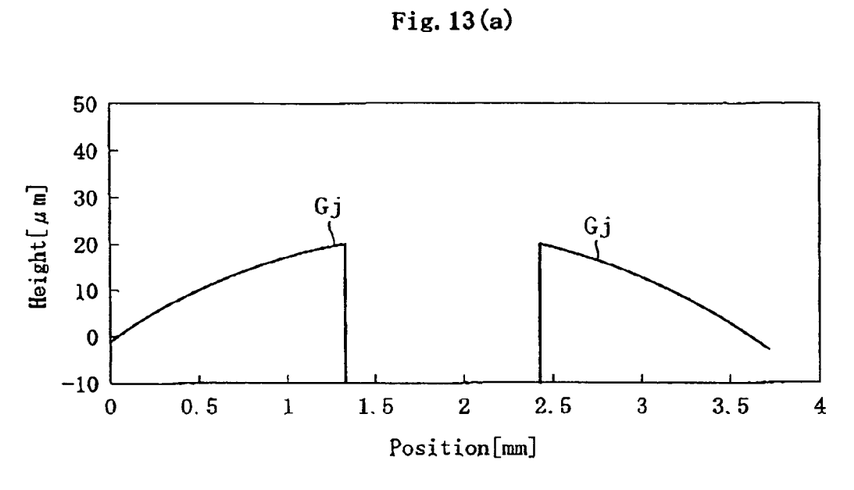
FIG. 13(a) is a schematic diagram showing shape of a top-surface of the substrate for the optical fiber array after the drawing process, where width and thickness have a predetermined relationship and a plurality of grooves are formed only on the top of the substrate.
Figure 13B:
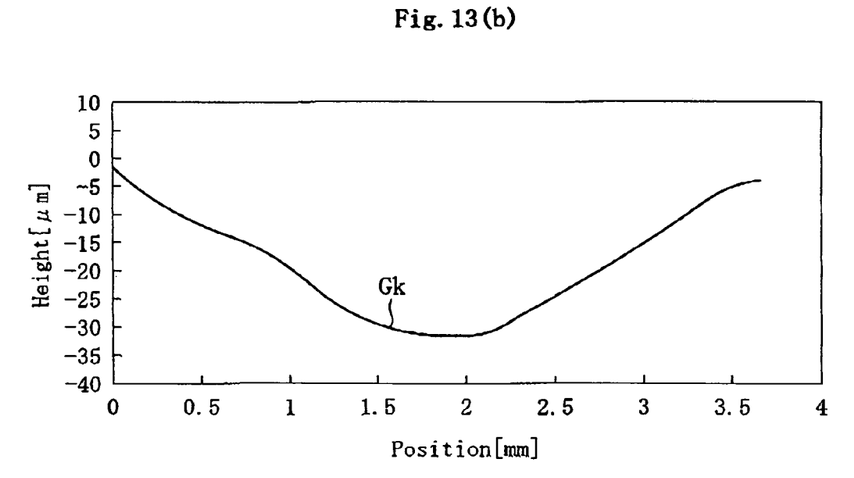
FIG. 13(b) is a schematic diagram showing shape of a bottom of the substrate for the optical fiber array after the drawing process.
Figure 14A:
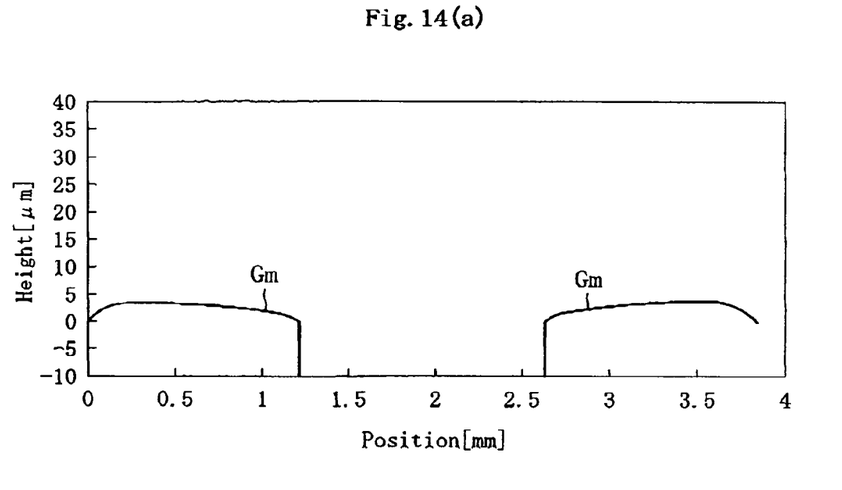
FIG. 14(a) is a schematic diagram showing shape of a top-surface of the substrate for the optical fiber array after the drawing process, where width and thickness have a predetermined relationship and a plurality of grooves are formed on both the top and the bottom of the substrate.
Figure 14B:
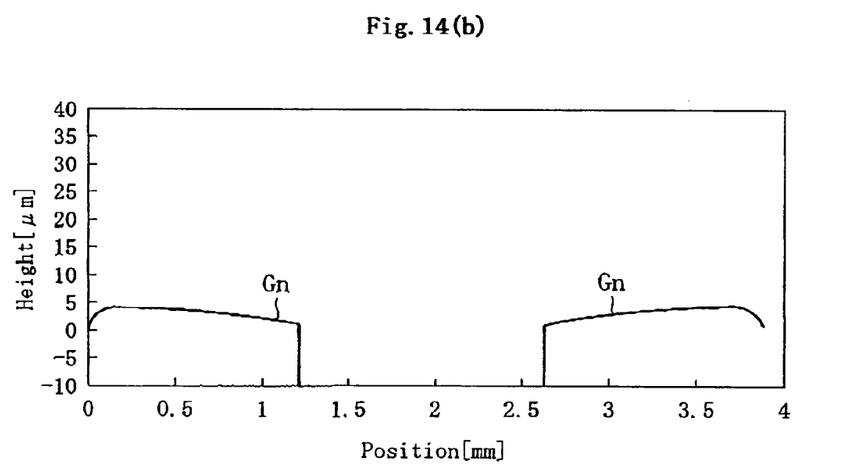
FIG. 14(b) is a schematic diagram showing shape of the bottom-surface of the substrate for the optical fiber array after the drawing process.

In Examples 3 of the present invention, in order to fabricate an eight-fiber substrate (optical-fiber aligning part) having a widthwise-direction dimension greater than 5/3 times of a thickness-direction dimension, specifically having a widthwise-direction dimension of 4 mm, a thickness-direction dimension of 1 mm, and pitch between each groove of 127 μm, a preliminary preform, on which the top was provided with large V-grooves and the bottom was provided with no large V-groove, was fabricated. Then, a preliminary preform was drawn while being heated by the heater such that viscosity reaches $10^3$ to $10^9$ dPa•s. The obtained optical-fiber aligning part of the substrate has a projected top-surface as shown by the curve Gj in FIG. 13(a) and a recessed bottom-surface as shown by the curve Gk in FIG. 13(b), and is bended by 20 μm or more as a whole. Next, the eight large V-grooves were formed on the bottom of the preform similar to the aforementioned preform, and the preform was drawn in the same manner. The obtained optical-fiber aligning part had a top-surface and a bottom-surface of which center portion is slightly recessed in the widthwise direction, as shown by the curves Gm and Gn in FIGS. 14(a) and 14(b). As a result, the optical-fiber aligning part is not being bended. In this case, the top-surface and the bottom-surface can be easily distinguished by forming ten V-grooves in which the optical fibers are retained on the top-surface, the V-grooves provided at both ends in the widthwise direction serving as dummy grooves, and eight V-grooves on the bottom-surface in which no optical fiber is retained.

What is claimed is:

1. A substrate for an optical fiber array having an optical fiber-aligning part at least one a top thereof, the substrate being formed by a drawing process, the optical fiber-aligning part being formed with a plurality of parallel grooves for retaining and aligning a plurality of optical fibers,
    wherein the optical fiber-aligning part is shaped such that, in a cross section perpendicular to a longitudinal direction of the plurality of grooves of the optical fiber-aligning part, a top surface of the optical fiber-aligning part is recessed, a center portion of the top surface in a widthwise direction being most deeply recessed, with a depth of the recessed top surface gradually decreasing from the center portion toward both ends of the top surface in the widthwise direction, and
    wherein depths of grooves at the center portion are shallower than depths of grooves at both ends of the optical fiber-aligning part in the widthwise direction, the grooves being arranged such that the depths of the grooves gradually increase from the center portion toward both ends of the optical fiber-aligning part in the widthwise direction.

2. The substrate of claim 1, wherein a length of a straight line connecting a deepest bottom part of each of two adjacent grooves is a pitch length, and wherein pitch lengths between the grooves provided at the center portion are shorter than pitch lengths between the grooves at both ends of the optical fiber-aligning part in the widthwise direction.

3. The substrate of claim 1, wherein a length of a straight line connecting a deepest bottom part of each of two adjacent grooves is a pitch length, and wherein a pitch length between each groove is the same as or longer than a distance between a central axis of each optical fiber retained in each groove.

4. The substrate of claim 1, wherein a plurality of grooves are formed in parallel on a bottom of the optical fiber-aligning part.

5. The substrate of claim 4, wherein a widthwise dimension of the optical fiber-aligning part is 5/3 times longer than a thickness-direction dimension of the optical fiber-aligning part, the thickness-direction dimension being a distance from the top to the bottom of the optical fiber-aligning part.

* * * * *